US009673936B2

(12) United States Patent
Dharmapurikar et al.

(10) Patent No.: US 9,673,936 B2
(45) Date of Patent: Jun. 6, 2017

(54) METHOD AND SYSTEM FOR PROVIDING ERROR CORRECTION TO LOW-LATENCY STREAMING VIDEO

(71) Applicant: GOOGLE INC., Mountain View, CA (US)

(72) Inventors: Makarand Dharmapurikar, Fremont, CA (US); Alexander Izvorski, San Francisco, CA (US)

(73) Assignee: Google Inc., Mountain View, CA (US)

(*) Notice: Subject to any disclaimer, the term of this patent is extended or adjusted under 35 U.S.C. 154(b) by 370 days.

(21) Appl. No.: 14/204,385

(22) Filed: Mar. 11, 2014

(65) Prior Publication Data
US 2014/0281836 A1 Sep. 18, 2014

Related U.S. Application Data

(60) Provisional application No. 61/793,489, filed on Mar. 15, 2013.

(51) Int. Cl.
*H04L 1/00* (2006.01)
*H04L 1/18* (2006.01)
*H04L 5/22* (2006.01)

(52) U.S. Cl.
CPC .......... *H04L 1/0076* (2013.01); *H04L 1/1819* (2013.01); *H04L 1/1877* (2013.01); *H04L 2001/0093* (2013.01)

(58) Field of Classification Search
CPC ... H04L 1/0076; H04L 1/1819; H04L 1/1877; H04L 2001/0093
See application file for complete search history.

(56) References Cited

U.S. PATENT DOCUMENTS

| 7,657,644 B1* | 2/2010 | Zheng | H04L 12/1886 709/231 |
|---|---|---|---|
| 2007/0050695 A1* | 3/2007 | Schulz | H03M 13/03 714/752 |
| 2008/0140854 A1* | 6/2008 | Shin | H04L 69/40 709/231 |
| 2008/0172593 A1* | 7/2008 | Rainish | H04N 19/89 714/776 |
| 2009/0201988 A1* | 8/2009 | Gazier | H04N 21/222 375/240.06 |
| 2011/0055656 A1* | 3/2011 | Ben-Zedeff | H04L 1/0009 714/752 |

(Continued)

*Primary Examiner* — April Y Blair
*Assistant Examiner* — Dipakkumar Gandhi
(74) *Attorney, Agent, or Firm* — Brake Hughes Bellermann LLP (57) ABSTRACT

Disclosed is a method for providing error correction to a video stream transmitted from a server to a client device, wherein the server is connected to an intermediate module over a bandwidth-limited network and the intermediate module is connected to the client device over a lossy network. The method includes intercepting data transmitted from the bandwidth-limited network to the lossy network by the intermediate module, identifying the video stream for error correction from the intercepted data at the intermediate module, generating error correction data for the video stream by the intermediate module and transmitting a modified stream that includes the video stream and the error correction data over the lossy network to the client device by the intermediate module.

26 Claims, 7 Drawing Sheets

(56) References Cited

U.S. PATENT DOCUMENTS

2011/0154164 A1* 6/2011 Seo ................... H03M 13/356
  714/784
2011/0197246 A1* 8/2011 Stancato ............ H04L 65/4076
  725/111

* cited by examiner

METHOD AND SYSTEM FOR PROVIDING ERROR CORRECTION TO LOW-LATENCY STREAMING VIDEO

CROSS-REFERENCE TO RELATED APPLICATIONS

The present application claims the benefit of U.S. Provisional Patent Application 61/793,489 filed on Mar. 15, 2013, which is hereby incorporated by reference in its entirety.

FIELD OF THE INVENTION

This invention relates to a method and system for providing error correction to low-latency streaming video.

BACKGROUND

Video streams are conventionally transmitted from a server to a client over a network with a bandwidth limited and a lossy segment. In some situations, the server transmits the video stream over a bandwidth limited network to an intermediate device such as a modem or router, which then further transmits the video stream over a lossy network to the client device. The bandwidth limited network may include a wide-area network (WAN) connected to an internet service provider (e.g., digital subscriber line access multiplexer (DSLAM) or cable modem termination system (CMTS)), which is further connected to an internet service provider network.

Packet loss or errors associated with the video stream may occur along both the bandwidth-limited network and the lossy network. Packet loss or errors that occur along the bandwidth-limited network may be minimized by optimizing the level of service provided by the internet service provider. However, packet loss or errors that occur along the lossy network may be unavoidable, for example when the lossy network is a wireless network.

Conventionally, packet loss or errors associated with the video stream may be corrected using either retransmission or redundant transmission. Retransmission involves retransmitting portions of the video stream that have incurred packet loss or errors, and is widely used when sending data over TCP. Examples of retransmission include adaptive bitrate HTTP streaming which may utilize various protocols such as HLS, MPEG-DASH, Smooth Streaming, etc. However, retransmission is not suitable for low-latency applications because the round-trip time required to request and receive a replacement portion of the video stream is likely to exceed the latency budget.

Redundant transmission involves transmitting forward error correction (FEC) information with the video stream, such that packet loss or errors associated with the video stream may be corrected using the FEC information. Examples of FEC information include Low Density Parity Check Codes (LDPC) or Fountain Codes. Redundant transmission may also use mechanisms at the codec level designed to add data resiliency, for example generating frequent I-frames or periodic intra refresh. Redundant transmission uses some of the limited bandwidth available, and as such only a limited amount of FEC information may be appended to a video stream at the server for transmission across the bandwidth-limited network. The limited FEC information appended to the video stream at the server may not be sufficient for providing correction for all packet loss or errors that occur along the lossy network. Although the lossy network may not itself be bandwidth limited, the bandwidth-limited network controls the amount of FEC information that may be appended to the video stream at the server, and as such the amount of FEC information appended at the server may not be sufficient to overcome the loss or errors incurred along the lossy network.

SUMMARY

Some embodiments of the present invention are directed to a method for providing error correction to a video stream transmitted from a server to a client where the server transmits the video stream over a bandwidth-limited network to an intermediate module that further transmits the video stream over a lossy network to a client device. According to some embodiments, the method for providing error correction involves intercepting data from the bandwidth-limited network, identifying a video stream for error correction from the intercepted data at the intermediate module, generating error correction data for the video stream by the intermediate module, and transmitting a modified stream that includes the video stream and the error correction data over the lossy network to the client device by the intermediate module.

Further details of aspects, objects and advantages of the invention are described below in the detailed description, drawings and claims. Both the foregoing general description and the following detailed description are exemplary and explanatory and are not intended to be limiting as to the scope of the invention.

BRIEF DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only typical embodiments and are not therefore to be considered limiting of its scope.

DETAILED DESCRIPTION

Various embodiments are described hereinafter with reference to the figures. It should be noted that the figures are not necessarily drawn to scale. It should also be noted that the figures are only intended to facilitate the description of the embodiments, and are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiments" or "in other embodiments" in various places throughout this specification are not necessarily referring to the same embodiment or embodiments.

Some embodiments of the present invention are directed to a method for providing error correction to a video stream transmitted from a server to a client where the server transmits the video stream over a bandwidth-limited network to an intermediate module that further transmits the video stream over a lossy network to a client device. The method for providing error correction involves intercepting data from the bandwidth-limited network at the intermediate module, identifying the video stream for error correction from the intercepted data at the intermediate module, generating error correction data for the video stream by the intermediate module, and transmitting a modified stream that includes the video stream and the error correction data over the lossy network to the client device by the intermediate module. In this way, the amount of error correction data appended to the video stream is not limited by the available bandwidth of the bandwidth-limited network, overcoming the inefficiencies of conventional redundant transmission.

Figure 1:
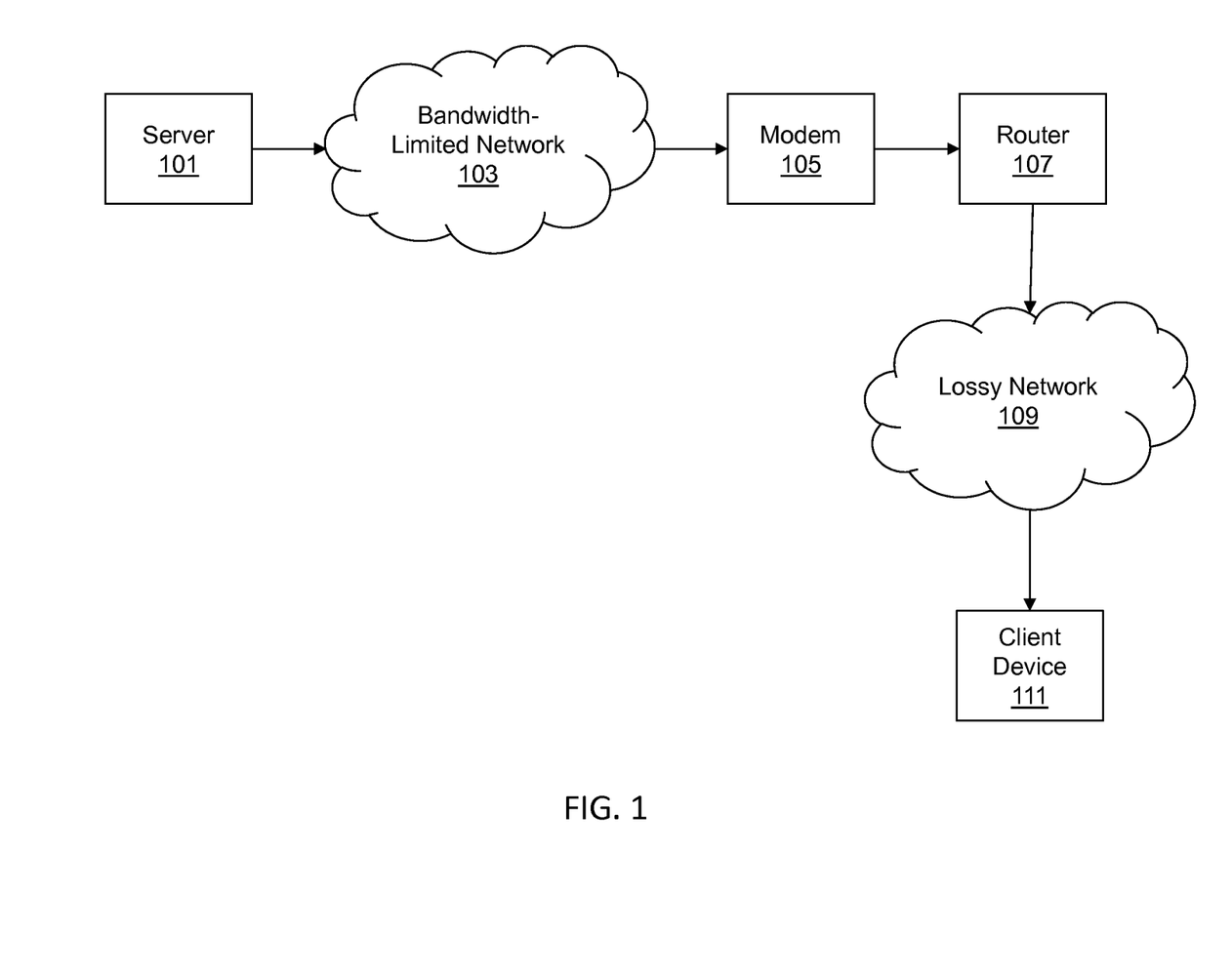
FIG. 1 is a schematic diagram illustrating an example system for transmitting video streams from a server to a client over both a bandwidth limited network and a lossy network.

Video streams may be transmitted from a server to a client over both a bandwidth limited network and a lossy network. FIG. 1 is a schematic diagram illustrating an example system for transmitting video streams from a server to a client over both a bandwidth limited network and a lossy network. In FIG. 1, a video stream generated at a server is transmitted across a bandwidth-limited network 103 to a modem 105. The modem 105 transmits the video stream to a router 107, which then transmits the video stream across a lossy network 109 to the client device 111. While FIG. 1 illustrates the video stream being transmitted from the bandwidth limited network 103 to a modem 105 and a router 107 before being transmitted across the lossy network 109, it is important to note that any intermediate switching device may be utilized to provide a transmission path between the bandwidth-limited network 103 and the lossy network 109.

The bandwidth limited network may include a wide-area network (WAN) connected to an internet service provider (e.g., digital subscriber line access multiplexer (DSLAM) or cable modem termination system (CMTS)), which is further connected to an internet service provider network.

Packet loss or errors associated with the video stream may occur along both the bandwidth-limited network 103 and the lossy network 109. Packet loss or errors that occur along the bandwidth-limited network 103 may be minimized by optimizing the level of service provided by the bandwidth-limited network 103 (e.g., internet service provider). However, packet loss or errors that occur along the lossy network 109 may be unavoidable.

Conventionally, packet loss or errors associated with the video stream may be corrected using either retransmission or redundant transmission. Retransmission involves retransmitting portions of the video stream that have incurred packet loss or errors, and is widely used when sending data over TCP. However, retransmission is not suitable for low-latency applications (e.g., video streams) because the round-trip time required to request and receive a replacement portion of the video stream is likely to exceed the latency budget.

Redundant transmission involves transmitting forward error correction (FEC) information with the video stream, such that packet loss or errors associated with the video stream may be corrected using the FEC information. Redundant transmission uses some of limited bandwidth available, and as such only a limited amount of FEC information may be appended to a video stream at the server 101 for transmission across the bandwidth-limited network 103. The limited FEC information appended to the video stream at the server may not be sufficient for providing correction for all packet loss or errors that occur along the lossy network 109. Although the lossy network 109 may not itself be bandwidth limited, the bandwidth-limited network 103 controls the amount of FEC information that may be appended to the video stream at the server 101.

Rather than appending error correction data to the video stream at the server 101, such that the amount of error correction data is limited by the available bandwidth of the bandwidth limited network 103, an intermediate module situated between the bandwidth-limited network and the lossy network may instead be used to intercept the video stream and generate error correction data to append to the video stream. Because the lossy network 109 is not bandwidth-limited, the amount of error correction data appended to the video stream at the intermediate module may be generated to ensure that the any packet loss or errors that occur along the lossy network 109 may be sufficiently corrected at the client device 111.

Figure 2A:
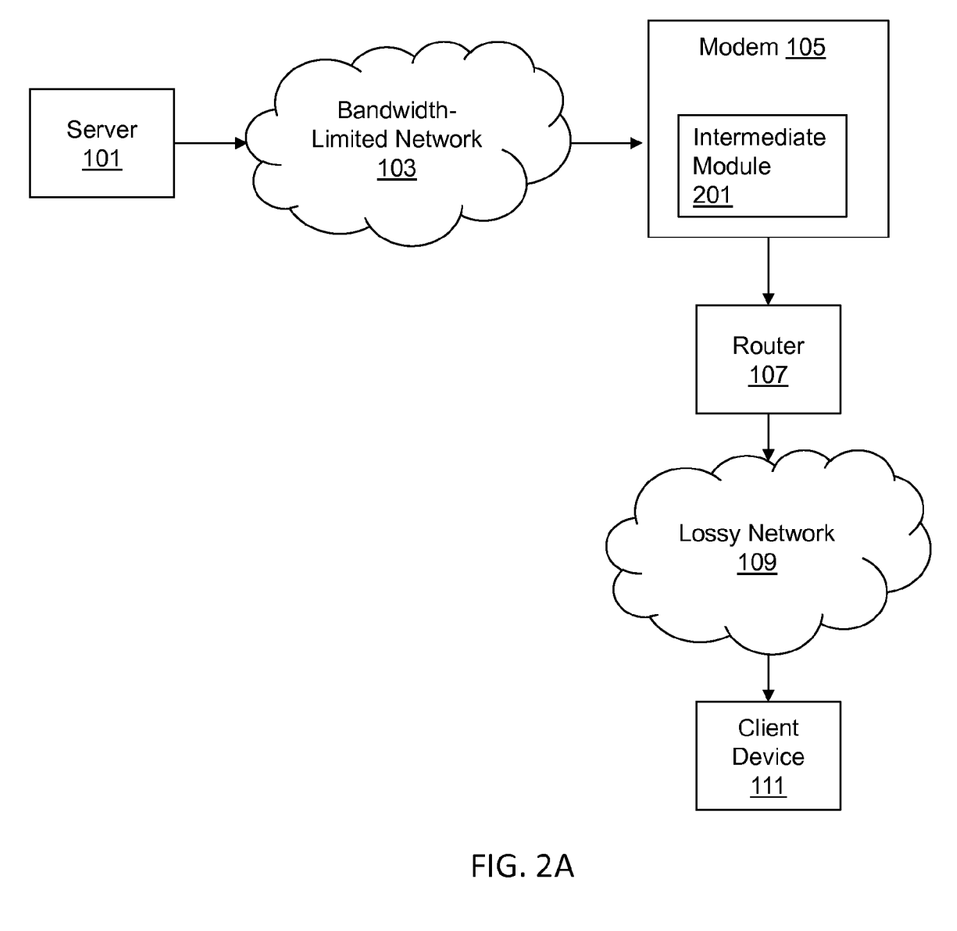
FIGS. 2A and 2B are schematic diagrams illustrating a system for providing error correction to video streams transmitted from a server to a client over both a bandwidth limited network and a lossy network using an intermediate module in accordance with some embodiments.
Figure 2B:
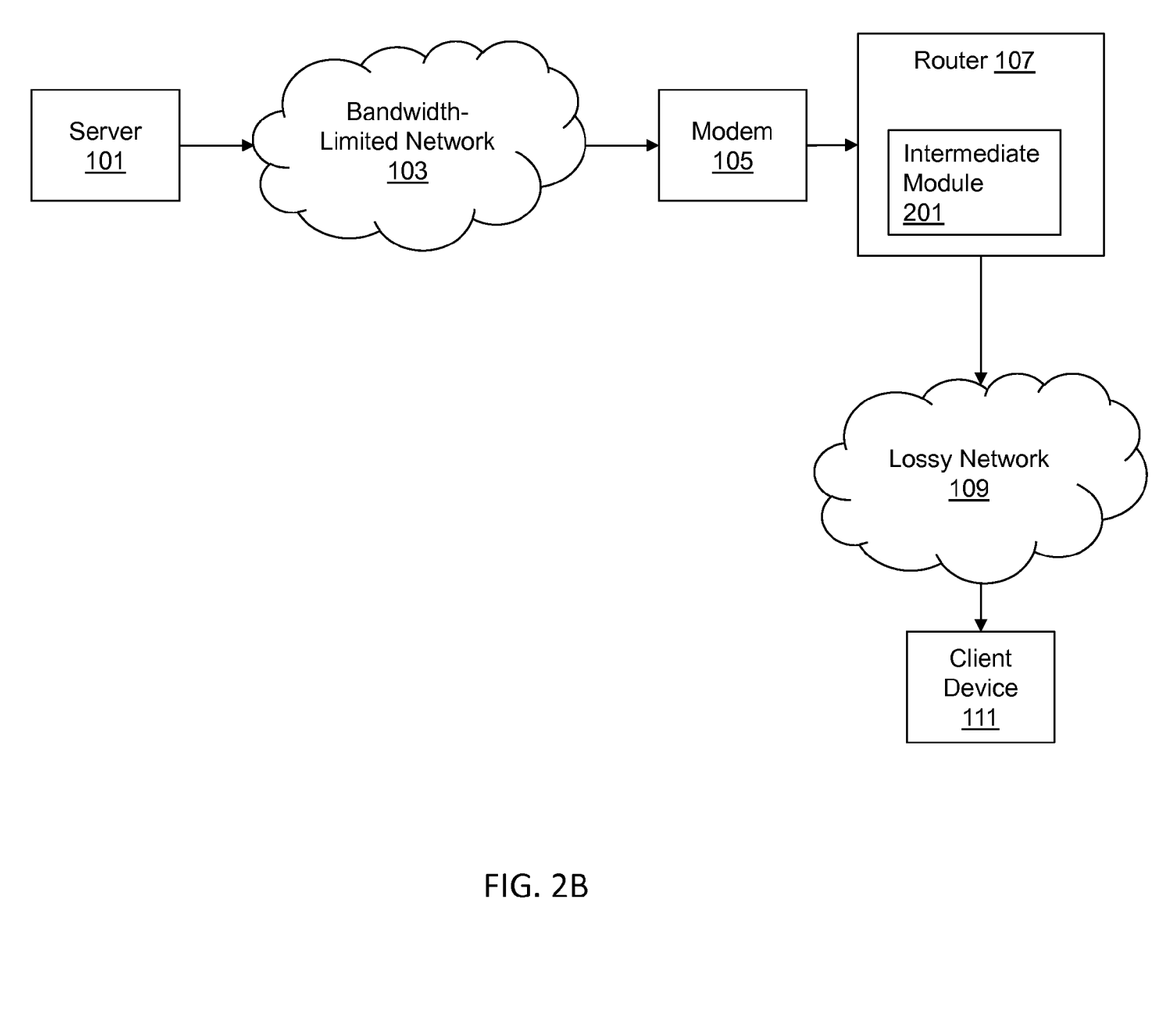

FIGS. 2A and 2B are schematic diagrams illustrating a system for providing error correction to video streams transmitted from a server to a client over both a bandwidth limited network and a lossy network using an intermediate module in accordance with some embodiments.

In FIG. 2A, the intermediate module 201 is implemented in the modem 105. In some embodiments the modem may be a cable modem or a DSL modem. In FIG. 2B, the intermediate module 201 is implemented in the router 107. In some embodiments, the router may be a Wi-Fi router. While FIGS. 2A and 2B illustrate two example embodiments of the intermediate module, it is important to note that the intermediate module 201 may be implemented as a software module in a router, modem, combined router/modem, as a standalone device, or as software module running in a switch situated at any point between the bandwidth-limited network 103 and the lossy network 109. For purposes of discussion, the following description will be made with respect to any of the intermediate module implementations discussed above.

The intermediate module 201 initially intercepts all data being transmitted from the bandwidth-limited network 103 to the lossy network 109. The intermediate module 201 may then identify a video stream from the data for error correction. For example, the intermediate module 201 may intercept data items for an audio stream that does not need error correction before intercepting a data item for a video stream that requires error correction. In some embodiments, the intermediate module 201 may identify video streams to perform error correction on using source/destination addresses, ports or port ranges, or by fingerprinting the video stream content.

After the intermediate module 201 identifies the video stream from the data for error correction, the intermediate module 201 may generate error correction data for the video stream. In generating the error correction data for the video stream, the intermediate module 201 may first determine an amount of error correction data to be generated for the video stream. The intermediate module 201 may determine the amount of error correction data to be generated for the video stream based on the available bandwidth of the lossy network 109, cross traffic associated with the lossy network 109, link quality of the lossy network 109 or recent interferences or collisions that have occurred along the lossy network 109. Such characteristics of the lossy network 109 may be determined by the intermediate module 201 by monitoring the activity of the lossy network 109.

Once the intermediate module 201 has generated error correction data for the video stream, it may transmit a modified stream that includes the video stream and the error correction data over the lossy network 109 to the client device 201. The intermediate module 201 may transmit the error correction data using an application specific protocol and may also send the error correction data to appear as if it originated from the server 101. By using an application specific protocol for error correction data transmission, the error correction data may be used by the specific application running at the client device 111 to correct any packet losses or errors associated with the video stream.

An example of this method for providing error correction follows below. The intermediate module 201 may intercept the video stream being transmitted from the bandwidth-limited network 103 to the lossy network 109 in packets. If a packet belongs to a known video stream, the packet may be transmitted and a copy of the packet may be saved in a buffer for the known video stream. A decision is then made as to whether the packet ends an error correction set for the video stream. If the packet does not end the error correction set for the video stream, the intermediate module 201 may continue processing packets until it identifies a packet that ends the error correction set for the video stream.

Once a packet has been identified that ends the error correction set for the video stream, a decision is made by the intermediate module 201 as to how much error correction data to generate for the set. The decision may be made based on the available bandwidth of the lossy network 109, cross traffic associated with the lossy network 109, link quality of the lossy network 109 or recent interferences or collisions that have occurred along the lossy network 109.

The generated error correction data along with the saved packets for the video stream are then transmitted as a modified stream to the client device 111. The intermediate module 201 may transmit the error correction data using an application specific protocol and may also send the error correction data to appear as if it originated from the server. This may be accomplished by modifying header fields of the modified stream to appear as if the modified stream originated from the server.

The client device 111 receives the modified stream and utilizes the error correction data to correct any packet loss or errors associated with the video stream that have occurred along the lossy network 109.

By intercepting video streams at the intermediate module 201 and generating error correction data at the intermediate module 201 rather than generating error correction data at the server 101, the amount of error correction data appended to the video stream is no longer limited by the available bandwidth of the bandwidth-limited network 103, thereby overcoming the inefficiencies of conventional redundant transmission. Additionally, the insufficiency of retransmission as a means for error correction due to the low-latency nature of video streams may be overcome by intercepting video streams at the intermediate module 201 and generating error correction data at the intermediate module 201.

Figure 3:
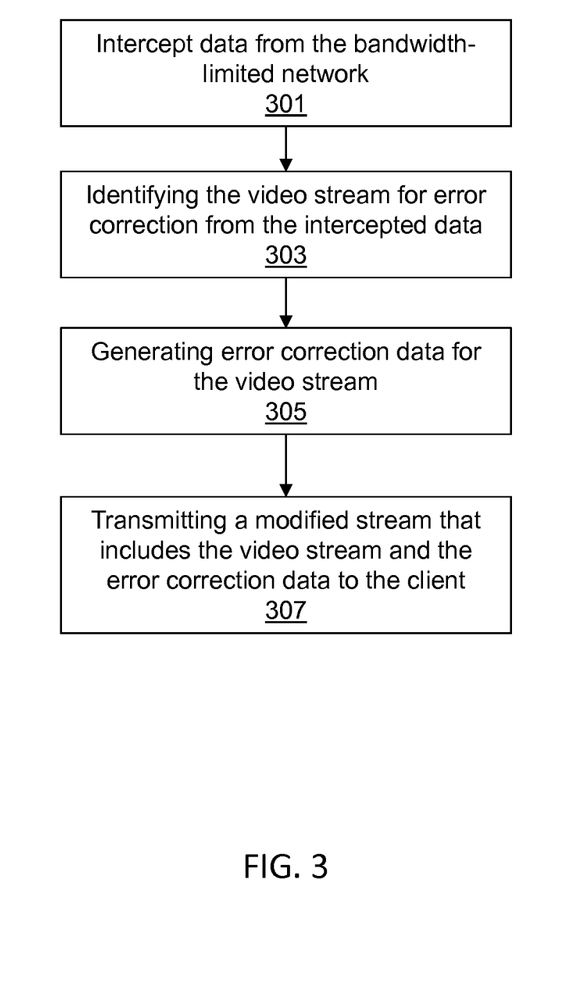
FIG. 3 is a flowchart illustrating a method for providing error correction to video streams transmitted from a server to a client over both a bandwidth limited network and a lossy network in accordance with some embodiments.

FIG. 3 is a flowchart illustrating a method for providing error correction to video streams transmitted from a server to a client over both a bandwidth limited network and a lossy network in accordance with some embodiments.

Initially an intermediate module situated between a bandwidth-limited network and a lossy network intercepts all data being transmitted from the bandwidth-limited network to the lossy network as shown at 301. In addition to data items associated with video streams, the intermediate module may also intercept data items associated with any other type of data streams (e.g., audio stream).

The intermediate module then identifies a video stream from the intercepted data for error correction as shown at 303. In some embodiments, the intermediate module may identify video streams to perform error correction on using source/destination addresses. In some other embodiments, the intermediate module may identify video streams to perform error correction on using ports or port ranges. In some other embodiments, the intermediate module may identify video streams to perform error correction on by fingerprinting the video stream content. One ordinarily skilled in the art will recognize that various mechanisms are available for identifying video streams to perform error correction on.

After the intermediate module identifies the video stream from the data for error correction, the intermediate module may generate error correction data for the video stream as shown at 305. In generating the error correction data for the video stream, the intermediate module may utilize characteristics associated with the lossy network including the available bandwidth of the lossy network, cross traffic associated with the lossy network, link quality of the lossy network or recent interferences or collisions that have occurred along the lossy network. Such characteristics of the lossy network may be determined by the intermediate module by monitoring the activity of the lossy network. One ordinarily skilled in the art will recognize that various other characteristics associated with the lossy network may also be used to generate error correction data for the video stream.

In some embodiments, the error correction data may be generated using Vandermonde matrices, low-density parity check codes, rateless codes, Luby transform codes, online codes, Raptor codes, or Raptor-Q codes. It is important to note that various other error correction data generating mechanisms also be used to generate error correction data.

In addition to intercepting the video stream from the bandwidth-limited network, the intermediate module may also intercept bandwidth-limited network error correction data. The bandwidth-limited network error correction data may be error correction data generated by the server, which may not be sufficient for providing correction for all packet loss or errors that occur along the lossy network. Prior to generating error correction data for the video stream, the intermediate module may first utilize the bandwidth-limited network error correction data to correct any packet losses or errors that may have occurred along the bandwidth-limited network.

Once the intermediate module has generated error correction data for the video stream, it may transmit a modified stream that includes the video stream and the error correction data over the lossy network to the client device as shown at 307. In some embodiments, the intermediate module may transmit the error correction data using an application specific protocol. In some embodiments, the intermediate module may send the error correction data to appear as if it originated from the server.

Figure 4:
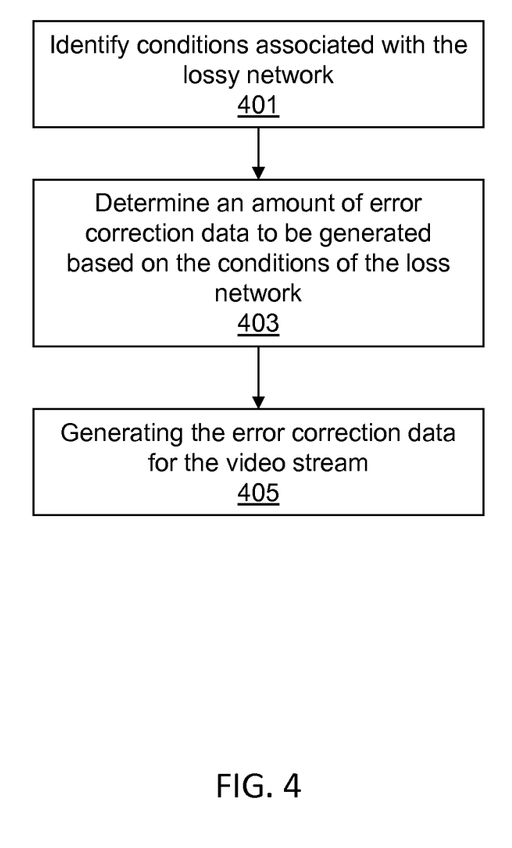
FIG. 4 is a flowchart illustrating a method for generating error correction data for video streams transmitted from a server to a client over both a bandwidth limited network and a lossy network in accordance with some embodiments.

FIG. 4 is a flowchart illustrating a method for generating error correction data for video streams transmitted from a server to a client over both a bandwidth limited network and a lossy network in accordance with some embodiments. Initially a video stream is intercepted by an intermediate module situated between the bandwidth-limited network and the lossy network and identified for error correction as described above in FIG. 3.

In generating the error correction data for the video stream, the intermediate module may first identify conditions associated with the lossy network as shown at 401. For example, the intermediate module may identify the available bandwidth of the lossy network, cross traffic associated with the lossy network, link quality of the lossy network or recent interferences or collisions that have occurred along the lossy network. Such characteristics of the lossy network may be determined by the intermediate module by monitoring the activity of the lossy network.

After the intermediate module has identified conditions associated with the lossy network, the intermediate module may determine an amount of error correction data to be generated for the video stream based on the identified conditions as shown at 403. For example, the intermediate module may determine that a lesser amount of error correction data should be generated for a lossy network experiencing a more limited amount of available bandwidth than a lossy network experiencing a less limited amount of available bandwidth. As another example, the intermediate module may determine that a greater amount of error correction data should be generated for a lossy network that has recently experienced a larger amount of interferences or collisions.

In some embodiments, different amounts of error correction data may be generated for different portions of the video stream. This may be based on anticipated packet loss or error varying for the different portions of the video stream.

Once the intermediate module has determined the amount of error correction data to be generated for the video stream, the intermediate module generates the error correction data for the video stream as shown at 405. A modified stream including the video stream and the error correction data may then be transmitted across the lossy network to the client device.

Figure 5:
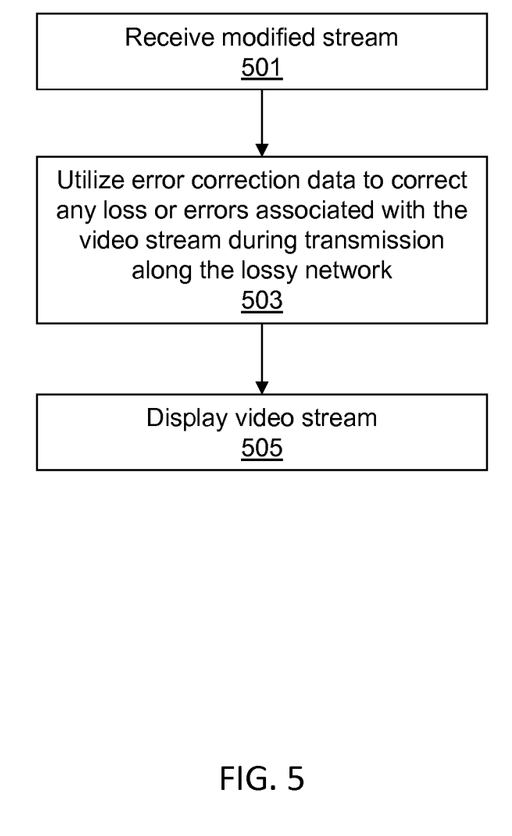
FIG. 5 is a flowchart illustrating a method for utilizing error correction data at a client device in accordance with some embodiments.

FIG. 5 is a flowchart illustrating a method for utilizing error correction data at a client device in accordance with some embodiments. Initially the client device receives the modified stream as shown at 501. The modified stream includes the video stream and the error correction data for the video stream generated by the intermediate module.

The client device then utilizes the error correction data to correct any packet loss or errors associated with transmission of the video stream across the lossy network as shown at 503. When the error correction data is transmitted by the intermediate device using an application specific protocol and a specific application running at the client device corresponding to the application specific protocol may utilize the error correction data to correct any packet losses or errors associated with transmission of the data stream across the lossy network. Additionally, the client device may recognize the error correction data as originating from the server where the intermediate module transmits the error correction data to appear as if it originated from the server.

Once the client device has corrected the packet loss and error associated with transmission of the video stream across the lossy network, the client device may display the video stream as shown at 505.

As discussed above, by intercepting video streams at the intermediate module and generating error correction data at the intermediate module rather than generating error correction data at the server, the amount of error correction data appended to the video stream is no longer limited by the available bandwidth of the bandwidth-limited network, thereby overcoming the inefficiencies of conventional redundant transmission. Additionally, the insufficiency of retransmission as a means for error correction due to the low-latency nature of video streams may be overcome by intercepting video streams at the intermediate module and generating error correction data at the intermediate module.

System Architecture Overview

Figure 6:
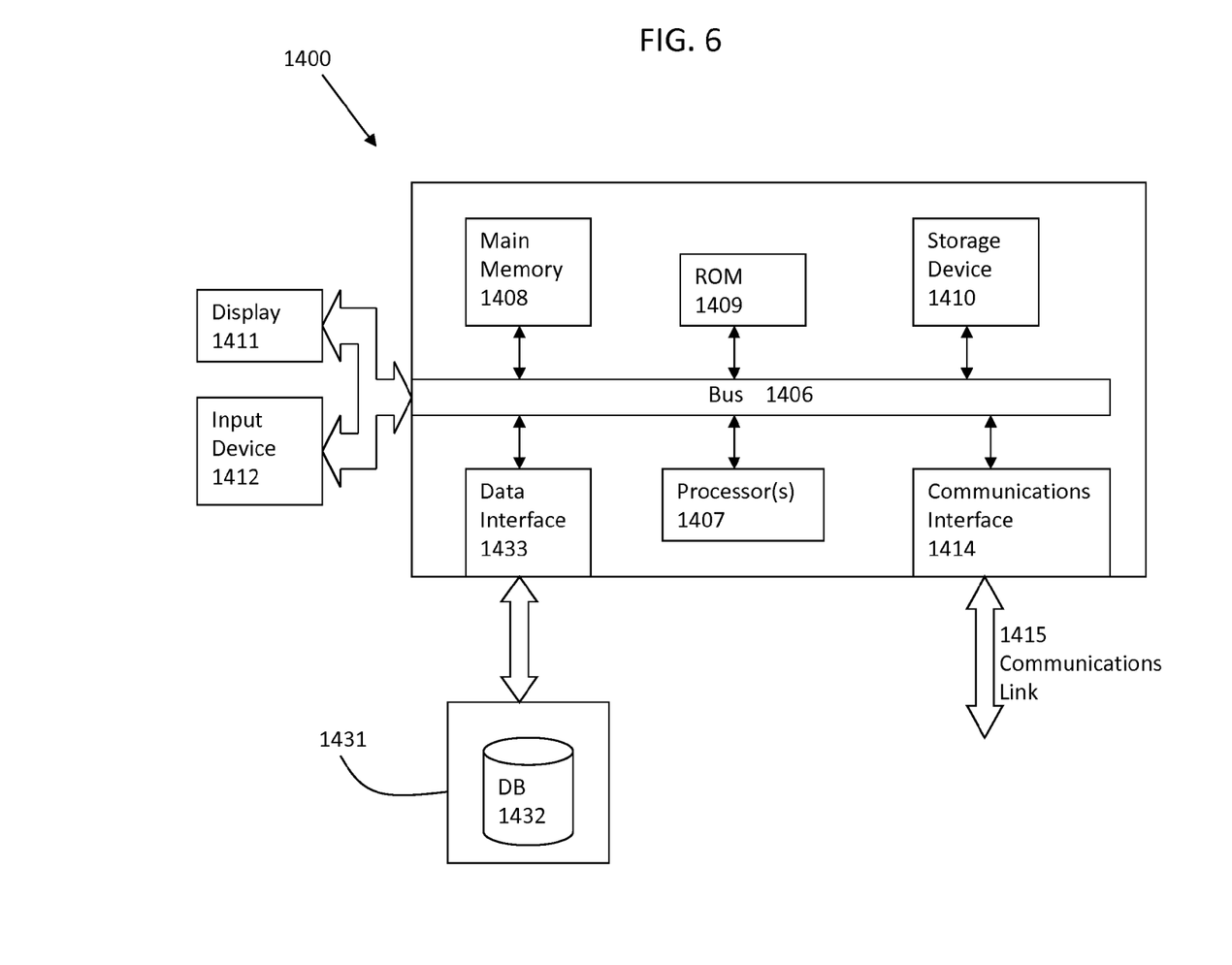
FIG. 6 is a block diagram of an illustrative computing system 1400 suitable for implementing an embodiment of the present invention.

FIG. 6 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Computer system 1400 may communicate through a data interface 1433 to a database 1432 on an external storage device 1431.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

What is claimed is:

1. A method for providing error correction to a video stream transmitted from a server to a client device, wherein:
    the server is connected to an intermediate module over a bandwidth-limited network; and
    the intermediate module is connected to the client device over a lossy network;
    the method comprising:
        intercepting data transmitted from the bandwidth-limited network to the lossy network by the intermediate module;
        identifying the video stream in the intercepted data at the intermediate module;
        determining an amount of error correction data for the video stream for the lossy network at the intermediate module; and
        when the determined amount of error correction is not present with the video stream in the intercepted data:
            generating the determined amount of error correction data for the video stream by the intermediate module; and
            transmitting a modified video stream that includes the video stream and the generated error correction data over the lossy network to the client device by the intermediate module.

2. The method of claim 1, wherein the intermediate module is implemented in a router or modem.

3. The method of claim 1, wherein determining the amount of error correction data to be generated for the video stream is based at least in part upon conditions associated with the lossy network.

4. The method of claim 3, wherein the conditions associated with the lossy network include an available bandwidth for the lossy network, cross traffic associated with the lossy network, link quality of the lossy network or recent interferences or collisions that have occurred along the lossy network.

5. The method of claim 1, wherein different amounts of error correction data may be generated for different portions of the video stream.

6. The method of claim 1, wherein the error correction data is sent in an application specific format.

7. The method of claim 1, further comprising setting by the intermediate module a field in a header of a packet transmitting at least a portion of the error correction data to identify the server as a transmitter of the error correction data.

8. The method of claim 1, wherein the error correction data is generated using at least one of: Vandermonde matrices, low-density parity check codes, rateless codes, Luby transform codes, online codes, Raptor codes, or Raptor-Q codes.

9. The method of claim 1, wherein the intermediate module receives bandwidth-limited network error correction data with the video stream and uses the bandwidth-limited network error correction data to correct the video stream received by the intermediate module prior to generating a set of error correction data for the video stream.

10. A computer program product comprising a non-transitory computer usable medium having executable code to execute a method for providing error correction to a video stream transmitted from a server to a client, wherein: the server is connected to an intermediate module over a bandwidth-limited network; and the intermediate module is connected to the client over a lossy network; the method comprising:
    intercepting data transmitted from the bandwidth-limited network to the lossy network by the intermediate module; identifying the video stream in the intercepted data at the intermediate module; determining, at the intermediate module, an amount of error correction data for the video stream for the lossy network, the bandwidth-limited network having an available amount of bandwidth that is insufficient to transmit the determined amount of error correction data for the lossy network; generating the determined amount of error correction data for the video stream by the intermediate module rather than by the server;
    and transmitting a modified video stream that includes the video stream and the generated error correction data over the lossy network to the client by the intermediate module.

11. The computer program product of claim 10, wherein the intermediate module is implemented in a WiFi router or modem.

12. The computer program product of claim 10, wherein determining the amount of error correction data to be generated for the video stream is based at least in part upon conditions associated with the lossy network.

13. The computer program product of claim 12, wherein the conditions associated with the lossy network include an available bandwidth for the lossy network, cross traffic associated with the lossy network, link quality of the lossy network or recent interferences or collisions that have occurred along the lossy network.

14. The computer program product of claim 10, wherein different amounts of error correction data may be generated for different portions of the video stream.

15. The computer program product of claim 10, wherein the error correction data is sent in an application specific format.

16. The computer program product of claim 10, further comprising setting by the intermediate module a field in a header of a packet transmitting at least a portion of the error correction data to identify the server as a transmitter of the error correction data.

17. The computer program product of claim 10, wherein the error correction data is generated using at least one of: Vandermonde matrices, low-density parity check codes, rateless codes, Luby transform codes, online codes, Raptor codes, or Raptor-Q codes.

18. The computer program product of claim 10, wherein the intermediate module receives bandwidth-limited network error correction data with the video stream and uses the bandwidth-limited network error correction data to correct the video stream received by the intermediate module prior to generating a set of error correction data for the video stream.

19. An intermediate module for providing error correction to a video stream transmitted from a server to a client device, wherein:
 the server is connected to the intermediate module over a bandwidth-limited network; and
 the intermediate module is connected to the client device over a lossy network;
 the intermediate module being configured to:
  intercept data transmitted from the bandwidth-limited network to the lossy network by the intermediate module;
  identify the video stream in the intercepted data at the intermediate module;
  determine an amount of error correction data for the video stream for the lossy network at the intermediate module; and
  when the determined amount of error correction is not present with the video stream in the intercepted data:
   generate error correction data for the video stream; and
   transmit a modified stream that includes the video stream and the error correction data over the lossy network to the client device.

20. The intermediate module of claim 19, wherein the intermediate module is implemented in a router or modem.

21. The intermediate module of claim 19, wherein determining the amount of error correction data to be generated for the video stream is based at least in part upon conditions associated with the lossy network.

22. The intermediate module of claim 21, wherein the conditions associated with the lossy network include an available bandwidth for the lossy network, cross traffic associated with the lossy network, link quality of the lossy network or recent interferences or collisions that have occurred along the lossy network.

23. The intermediate module of claim 19, wherein different amounts of error correction data may be generated for different portions of the video stream.

24. The intermediate module of claim 19, wherein the error correction data is sent in an application specific format.

25. The intermediate module of claim 19, wherein the error correction data is generated using at least one of:
 Vandermonde matrices, low-density parity check codes, rateless codes, Luby transform codes, online codes, Raptor codes, or Raptor-Q codes.

26. The intermediate module of claim 19, wherein the intermediate module receives bandwidth-limited network error correction data with the video stream and uses the bandwidth-limited network error correction data to correct the video stream received by the intermediate module prior to generating a set of error correction data for the video stream.

* * * * *